US008555272B2

(12) United States Patent
Wetherly et al.

(10) Patent No.: US 8,555,272 B2
(45) Date of Patent: *Oct. 8, 2013

(54) SYSTEM AND METHOD FOR IMPLEMENTING DATA-COMPATIBILITY-BASED VERSION SCHEME

(75) Inventors: Curtis Wetherly, Toronto (CA); Bryan R. Goring, Milton (CA); Michael Shenfield, Richmond Hill (CA); Michael Cacenco, Brampton (CA)

(73) Assignee: Research In Motion Limited, Waterloo, CA (US)

( * ) Notice: Subject to any disclaimer, the term of this patent is extended or adjusted under 35 U.S.C. 154(b) by 476 days.

This patent is subject to a terminal disclaimer.

(21) Appl. No.: 12/725,028

(22) Filed: Mar. 16, 2010

(65) Prior Publication Data

US 2010/0175059 A1 Jul. 8, 2010

Related U.S. Application Data

(63) Continuation of application No. 11/218,432, filed on Sep. 6, 2005, now Pat. No. 7,698,702.

(60) Provisional application No. 60/672,094, filed on Apr. 18, 2005.

(51) Int. Cl.
*G06F 9/445* (2006.01)

(52) U.S. Cl.
USPC ............ 717/170; 717/174; 707/695; 707/806

(58) Field of Classification Search
USPC .............. 717/168–178; 455/418–421, 422.1, 455/426; 709/202, 203; 707/638, 695, 806
See application file for complete search history.

(56) References Cited

U.S. PATENT DOCUMENTS 5,404,488 A 4/1995 Kerrigan et al.
6,345,288 B1 2/2002 Reed et al.
(Continued)

FOREIGN PATENT DOCUMENTS

CN 1507299 A 6/2004
EP 0632371 B1 * 9/2001
(Continued)

OTHER PUBLICATIONS

Andany et al., Management of Schema Evolution in Databases, Proceedings of the 17th International Conference on Very Large Data Bases, 1991, pp. 161-170.*

(Continued)

*Primary Examiner* — Wei Zhen
*Assistant Examiner* — Satish Rampuria

(57) ABSTRACT

A versioning schema enforced by the application development environment enables the runtime environment of a terminal device to evaluate a software update to identify potential compatibility issues and control installation of the update. The versioning schema includes a respective field for each one of a plurality of aspects of the application and defines an initial value of each field when an initial application load is released. For each successive software update affecting the application, the method involves identifying each aspect of the application affected by the software update and incrementing a value of the respective field of each identified aspect. The version number can be in the form D.M.F where D, M and F are incremented in response to changes in the application relating to data components, message components and features.

21 Claims, 6 Drawing Sheets

(56) References Cited

U.S. PATENT DOCUMENTS

| | | | |
|---|---|---|---|
| 6,460,052 | B1 | 10/2002 | Thomas et al. |
| 6,519,767 | B1 * | 2/2003 | Carter et al. .................. 717/140 |
| 6,567,380 | B1 | 5/2003 | Chen |
| 6,868,425 | B1 | 3/2005 | Bergstraesser et al. |
| 6,971,093 | B1 * | 11/2005 | Spring .......................... 717/170 |
| 7,076,496 | B1 | 7/2006 | Ruizandrade |
| 7,080,371 | B1 | 7/2006 | Arnaiz et al. |
| 2002/0166001 | A1 | 11/2002 | Cheng et al. |
| 2004/0024795 | A1 | 2/2004 | Hind et al. |
| 2004/0024878 | A1 | 2/2004 | Makimoto et al. |
| 2004/0068721 | A1 | 4/2004 | O'Neill et al. |
| 2005/0198630 | A1 * | 9/2005 | Tamma et al. ................ 717/175 |
| 2005/0289534 | A1 * | 12/2005 | Kim et al. ..................... 717/172 |
| 2006/0080651 | A1 * | 4/2006 | Gupta et al. .................. 717/169 |
| 2006/0236083 | A1 * | 10/2006 | Fritsch et al. ...................... 713/1 |

FOREIGN PATENT DOCUMENTS

| | | |
|---|---|---|
| EP | 06326371 B1 * | 9/2001 |
| EP | 1429561 A1 * | 6/2004 |
| EP | 1429569 A1 * | 6/2004 |
| WO | 9839930 A2 | 9/1998 |
| WO | 9949391 A2 | 9/1999 |
| WO | 9963432 A2 | 12/1999 |
| WO | 0169888 A1 | 9/2001 |
| WO | 0193019 A2 | 12/2001 |
| WO | 2004006158 A1 | 1/2004 |

OTHER PUBLICATIONS

Monk et al., Schema Evolution in OODBs Using Class Versioning, SIGMOD Record, vol. 22, No. 3, Sep. 1993, pp. 16-22.*

Franconi et al., A Semantic Approach for Schema Evolution and Versioning in Object-Oriented Databases, Springer-Verlag Berlin Heidelberg 2000, pp. 1048-1062.*

Co-operative Location Update Algorithm for Mobiles in Next Generation Cellular Networks, Shah, S. K., Tekinay, S, Saraydar, C., IEEE, 2004 pp. 331-336.

Independenty Updated Views, Kulkarni, U.R., Ramirez, R.G., IEEE vol. 9, Issue 5, 1997, pp. 798-812.

Supplementary European Search Report for EP 05778714, mailed Apr. 14, 2008.

Multiversion Reconciliation for Mobile Databases, Phatak, S.H., Badrinath, R.R., IEEE, 1999, pp. 582-589.

Rampuria, Satish, USPTO Office Communication mailed Sep. 18, 2008 in relation to U.S. Appl. No. 11/218,432.

Rampuria, Satish, USPTO Office Communication mailed Feb. 27, 2009 in relation to U.S. Appl. No. 11/218,432.

Rampuria, Satish, USPTO Office Communication mailed May 26, 2009 in relation to U.S. Appl. No. 11/218,432.

Rampuria, Satish, USPTO Office Communication mailed Jul. 1, 2009 in relation to U.S. Appl. No. 11/218,432.

Rampuria, Satish, USPTO Office Communication mailed Sep. 1, 2009 in relation to U.S. Appl. No. 11/218,432.

Rampuria, Satish, USPTO Office Communication mailed Nov. 23, 2009 in relation to U.S. Appl. No. 11/218,432.

Eftimescu, Nicolae. European Patent Office Communication pursuant to Article 94(3) EPC dated May 4, 2012, in relation to European Patent Application No. 05778714.5, 4 pages.

* cited by examiner

SYSTEM AND METHOD FOR IMPLEMENTING DATA-COMPATIBILITY-BASED VERSION SCHEME

CROSS-REFERENCE TO RELATED APPLICATIONS

This application is a continuation of application Ser. No. 11/218,432 filed Sep. 6, 2005, which claims the benefit of U.S. Provisional Patent Application Ser. No. 60/672,094 filed Apr. 18, 2005. The contents of both applications are hereby incorporated by reference.

TECHNICAL FIELD

The present invention relates to wireless communications devices and, in particular, to a method and system for implementing a data-compatibility-based version scheme for updates to a wireless application installed on wireless communications devices.

BACKGROUND OF THE INVENTION

The number and variety of wireless terminal devices, such as mobile telephones, personal computers and PDAs (Personal Digital Assistants) with wireless communication capabilities, self-service kiosks and two-way pagers is rapidly increasing. Software applications which run on these devices increase their utility. For example, a mobile phone may include an application which retrieves the weather for a range of cities, or a PDA may include an application that allows a user to shop for groceries. These software applications take advantage of the connectivity to a network in order to provide timely and useful services to users.

As is well known in the art, software application developers frequently produce new and/or updated versions of their software. Such software updates may be released on a very frequent basis, as, for example, in the case of patches to resolve defects in previously released software. Major upgrades may be released on, for example, a yearly or bi-yearly basis, and often provide new functions to enhance the utility of a particular device.

However, while software developers may readily develop and release software updates, actual implementation of updates on all of the affected devices is highly complex. For example, in a wireless network, connectivity is frequently intermittent, so that a particular device may not be connected to a network when an update is released. In this case, some means is needed to enable the update to be downloaded and installed at some later time. Even when this is accomplished, some devices may lack resources (such as sufficient memory) to download and successfully install a particular update. In other cases, an application update may require that a device's controller software be updated before the application update is installed. In still other cases, a series of application updates must be downloaded and installed in a particular order. Thus, for example, an application upgrade which provides a new feature, must be installed before a service patch which corrects several issues including a deficiency in the new feature.

Accordingly, methods and systems for controlling the installation of software updates to wireless terminal devices remain highly desirable.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
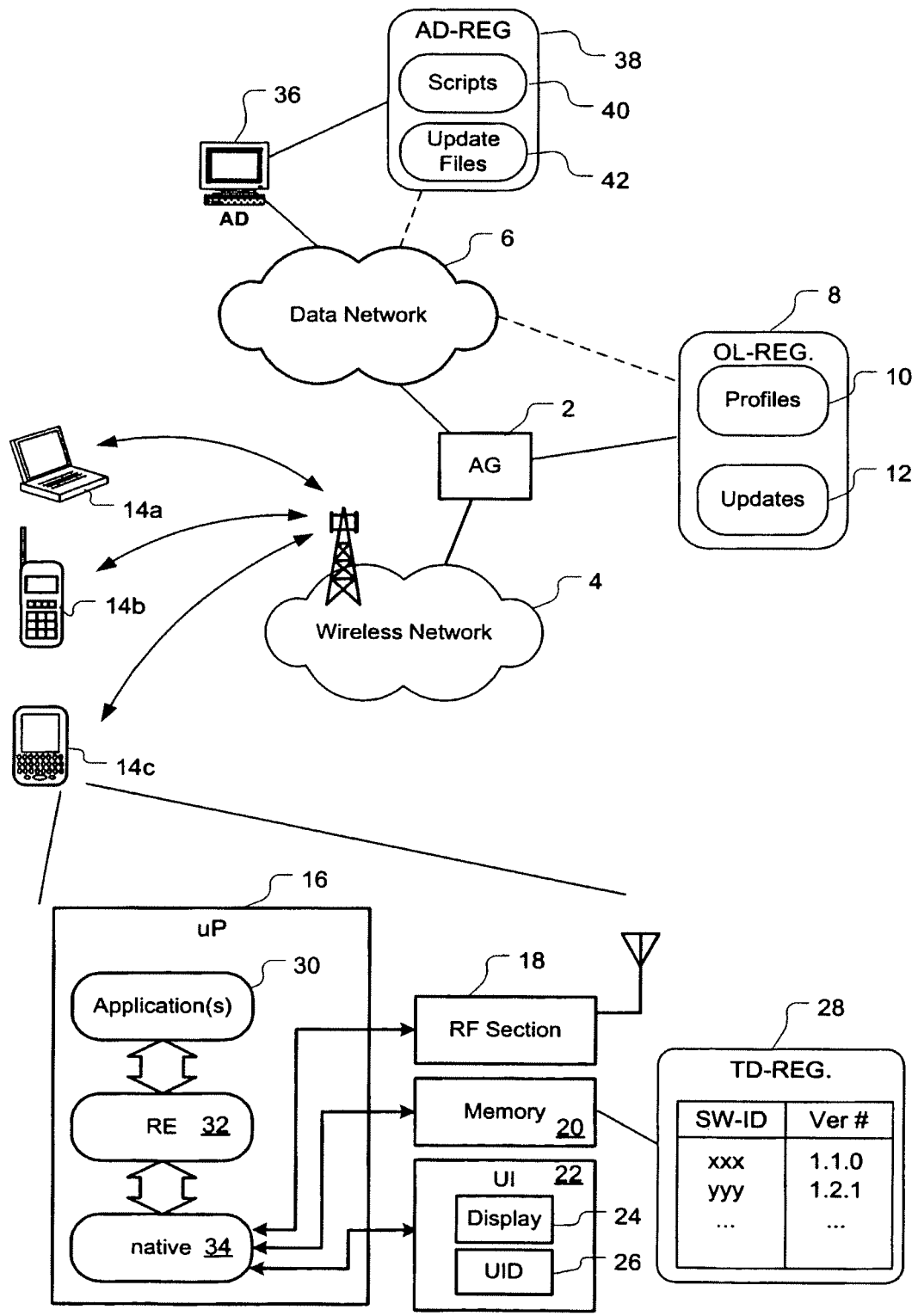
FIG. 1 is a block diagram schematically illustrating a network system.

An object of the present invention is to provide a method and system for controlling the installation of software updates to wireless terminal devices.

Thus, an aspect of the present invention provides a method of controlling asynchronous installation of a software update on a terminal device of a wireless network. According to the present invention, an update notification message in respect of the software update is received by an Application Gateway hosting the terminal device. The update notification message comprises a software identifier uniquely identifying an application affected by the update; a version number associated with the software update; and an address of an update script on a data network accessible by the terminal device. The update script is adapted to install the software update on the terminal device. The update notification message is logged in an updates registry, and a notification message is forwarded to the terminal device. The notification message includes the software identifier, the version number and the address of the update script, so that the terminal device can access and execute the update script to install the software update.

A further aspect of the present invention provides a method of controlling installation of a software update on a terminal device of a wireless network. According to the present invention, an update-notification message comprising information respecting an available software update is received by a runtime environment of the terminal device. The update notification message comprises: a software identifier uniquely identifying an application affected by the update; a version number associated with the software update; and an address of an update script on a data network accessible by the terminal device, the update script being adapted to install the software update on the terminal device. A compatibility of the software update is determined using the update version number. Thereafter, the update script is accessed using the address, and executed to install the software update.

A still further aspect of the present invention provides a method of enabling controlled distribution of software updates affecting an application installed on a plurality of terminal devices of a wireless network. According to the present invention a version schema is defined comprising a respective field for each one of a plurality of aspects of the application. An initial value of each field is defined when an initial application load is released. For each successive software update affecting the application, each aspect of the application affected by the software update is identified, and the value of the respective field is incremented.

Yet another aspect of the present invention provides a system for enabling controlled distribution of software updates affecting an application installed on a plurality of terminal devices of a wireless network. The system includes a computing device connected to a data network for communicating with an application gateway mediating the data network and the wireless network. The system further includes an application development environment (ADE) running on the computing device for enabling the application to be updated, the ADE including a versioning module for generating a version number defined by a plurality of fields representing different aspects of the application. The versioning module includes means for comparing an updated version of the application with a previous version of the application to determine what changes have been made to the different aspects of the application; means for incrementing the fields of the version number in response to the changes to the different aspects of the application; and means for communicating the version number of the updated application to the application gateway.

Yet another aspect of the present invention provides a method of implementing a versioning scheme for updates to a software application to be distributed to a plurality of wireless devices in a wireless network through an application gateway mediating the wireless network and a data network. The method includes the step of defining an initial version number corresponding to an initial version of the application, the version number having at least three fields defining a data components field, a message components field and a features field. The method also includes the steps of incrementing the data components field in response to an update in an aspect of the application relating to data components; incrementing the message field in response to an update in the application relating to message components; and incrementing the features field in response to an update to aspects of the application relating to features, whereby an updated version number is generated that is indicative of the compatibility of the update with previous versions of the application.

The present invention provides methods and systems for controlling the distribution and installation of software updates on wireless terminal devices. Embodiments of the invention are described below, by way of example only, with reference to FIGS. 1-6.

Referring to FIG. 1, a system in accordance with a representative embodiment of the present invention generally includes an Application Gateway (AG) 2 coupled between a wireless network 4 and a data network 6, such as for example, the Internet; and an online registry 8 having a profiles registry 10 containing, for each subscriber's terminal device(s), a listing of information identifying software applications stored on the respective terminal device. The online registry also contains an updates registry 12 containing information identifying any available application updates.

The AG 2 generally operates to mediate message flows between terminal devices 14a, 14b, 14c connected to the wireless network 4 and data services accessible through the data network 6 in the manner described in Applicant's co-pending United States Patent Publications Nos. 2004/0215700 and 2004/0220998, both of which are incorporated herein by reference.

The online registry 8 can be co-resident with the AG 2 or may be located remotely from the AG and accessed by the AG via the data network 6. As noted above, the online registry 8 includes a profiles registry 10 and an updates registry 12. The profiles registry 10 contains a profile for each one of a plurality of terminal devices. Each profile contains, at a minimum, a listing of software identifiers (SW-IDs) uniquely identifying the runtime environment (RE) and each application installed on the respective terminal device. A respective "current" version number of each application installed on the terminal device may also be stored in the online registry in association with the respective SW-ID, or may be stored in the terminal device. A separate scripts registry 40 contains, for each software update, one or more scripts designed for implementing the software update on a terminal device.

In general, the terminal devices 14a, 14b, 14c can be any of a wide variety of software-controlled wireless devices including but not limited to wireless-enabled portable computers/laptops 14a, mobile/cellular telephones 14b, and PDAs 14c with wireless communication capabilities, self-service kiosks and two-way pagers. As may be seen in FIG. 1, such devices generally include a microprocessor 16 connected to an RF section 18 for wireless communications, a memory 20 (at least a portion of which will normally be non-volatile), and a user interface (UI) 22 including a display 24 and one or more user input devices (UID) 26, e.g. a keyboard, keypad, mouse, thumb-wheel, stylus, microphone, etc. The microprocessor 16 operates under software control to provide the functionality of the terminal device, i.e. to enable one or more application(s) 30 to run on the device. Preferably, the software is designed on a layered model, in which an RE 32 translates between application software 30 and the native machine-language 34 of the terminal device to control the terminal device hardware, and communicate with data services. This layered software model, and the manner in which it operates, is known from Applicant's co-pending United States Patent Publications Nos. 2004/0215700 and 2004/0220998. The RE can also maintain a terminal device registry 28 (denoted "TD-REG" in FIG. 1) identifying each application installed on the terminal device by a software ID, and the current version number of each application. Operation of the RE to enable asynchronous distribution and installation of software upgrades to terminal devices will be described in detail below.

As described in Applicant's co-pending United States Patent Publications Nos. 2004/0215700 and 2004/0220998, operation of the AG 2 enables a software application executing in a terminal device 14a, 14b, 14c to communicate with data services (not shown) offered through the data network 6. This operation may, for example, including accessing and downloading files from back-end data sources (not shown) connected to the data network 6. As may be seen in FIG. 1, and described in greater detail below, an application developer (AD) 36 can also distribute and support their software through the data network 6. For example, downloadable application software (i.e. installation scripts 40 and update files 42) can be stored in an application developer registry 38 which can be accessed by users (either directly or indirectly) through the data network 6.

Application Development Environment

Figure 2:
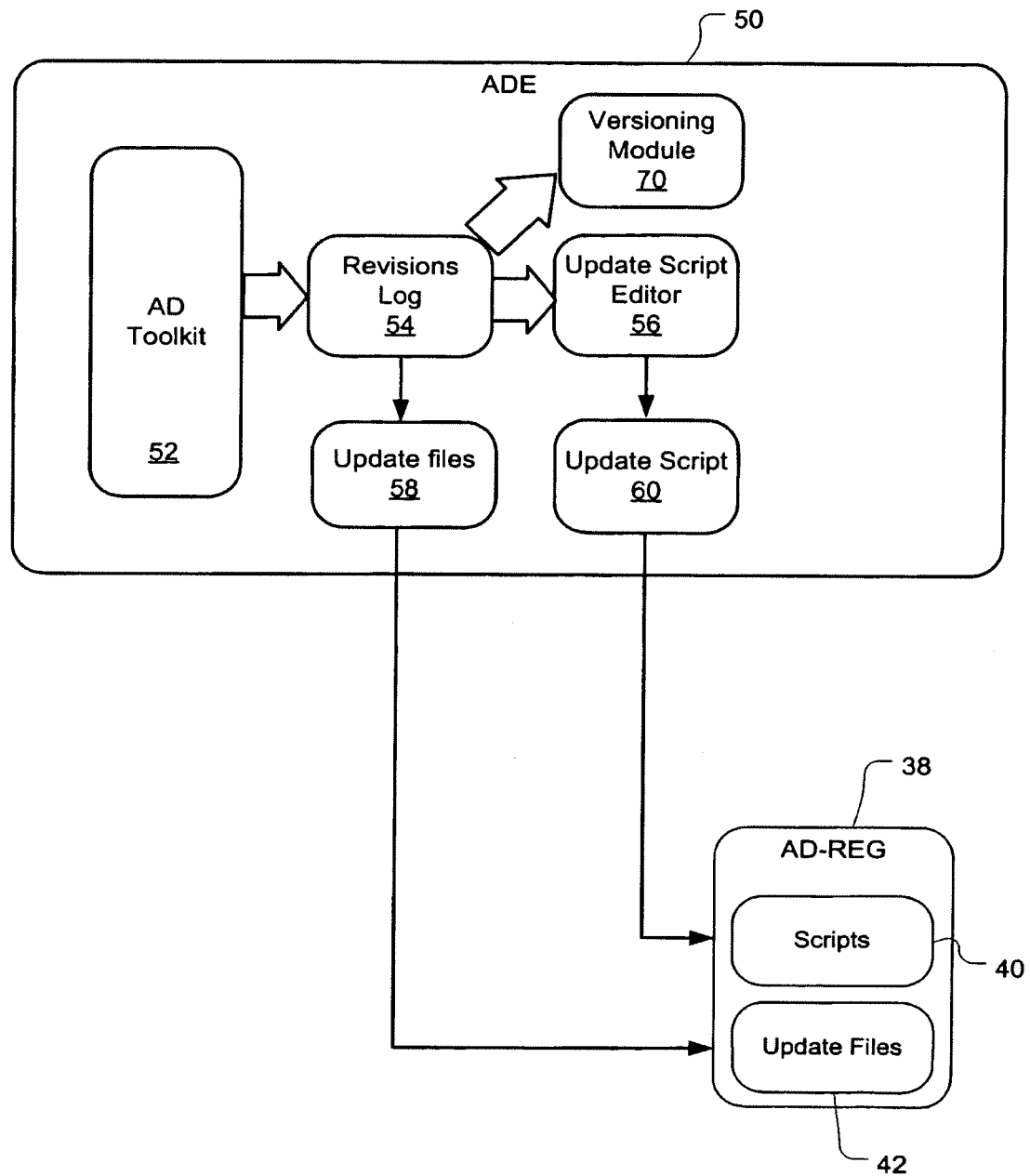
FIG. 2 is a block diagram schematically illustrating components and operation of an application development environment in accordance with an aspect of the present invention.

Referring now to FIG. 2, the application developer uses an application development toolkit (ADT) 52 of an application development environment (ADE) 50 running on a computing device to code, test, and debug application software, in a manner generally known in the art. The computing device can be a personal computer or laptop connected or connectable to the data network or other networked workstation. The same ADE 50 can also be used for developing subsequent updates of the application, again in a manner known in the art. In accordance with the present invention, the ADE 50 also includes a versioning module 70, which automatically assigns a version number based on changes made in the application source code during the process of coding, testing, and debugging. The versioning module 70 can also be used to generate an update script which, when executed in a terminal device, will download and install the update on the terminal device.

For example, the versioning module 70 can be used to identify any of the following:

- changes in existing data components, such as data structures, i.e. by adding or removing fields, or changing field type definition; changes in global variable definitions or enumerations;
- changes in existing messages, i.e. by adding or removing fields, or changing field type definition;
- changes in existing application logic;
- new data components, messages or application logic to be added to the application.

In each of these cases, the changes and additions detected by the versioning module 70 are those relative to the "current" version of the application (that is, the initial release with any subsequently released updates installed). As may be appreciated, detection of changes can be performed by either real-time tracking of actions (e.g. keystrokes) of the application developer 36 during the editing process using a revisions log 54, by comparing "before" and "after" versions of the application source code or by any other means for comparing an updated version of the application with a previous version of the application to determine what changes have been made. In each case, the versioning module 70 identifies new and/or revised data components, messages, and application logic, which are then written to one or more update files 58. These update files can then be saved to an update files registry 42, which is preferably resident within the application developer registry 38 as depicted in FIGS. 1 and 2.

Alternatively, in the embodiment as shown in FIG. 2, a revisions log 54 tracks the changes made to the application source code by the AD toolkit 52. The revisions log 54 then passes the resultant changes to the versioning module 70 for computation of a version number (as will be described below). The revisions log 54 can also communicate the changes to the update script editor 56. In this embodiment, the ADE 50 will also generate the update files from the changes tracked by the revisions log 54. Therefore, it will be appreciated that the versioning module can contain a revision log, or equivalent functionality, or the revisions log can be a separate module within the ADE.

In addition, an update script 60 can be generated to control a terminal device to download and install the update file(s) 58, as will be described in greater detail below. The update script 60 can be saved to a scripts registry 40, which is preferably resident within the application development registry (AD-REG) 38 as depicted in FIGS. 1 and 2.

If desired, an update script editor 56 (i.e. a script editor module) can be provided to enable the application developer to either compose the update script 60 manually, or to review and edit an auto-generated update script.

The update script 60 may conveniently be developed in a structured language, such as Java or XML, which thereby enables the terminal device to access one or more back-end data sources, via the data network 6, during the update process. This enables the update script 60 to access and download the update file(s) 58 as needed, during execution. This facilitates the asynchronous distribution of the update, because the update script 60 can "pull" the necessary update file(s) 58 from the back-end data source(s) during execution.

Versioning Schema

Figure 3:
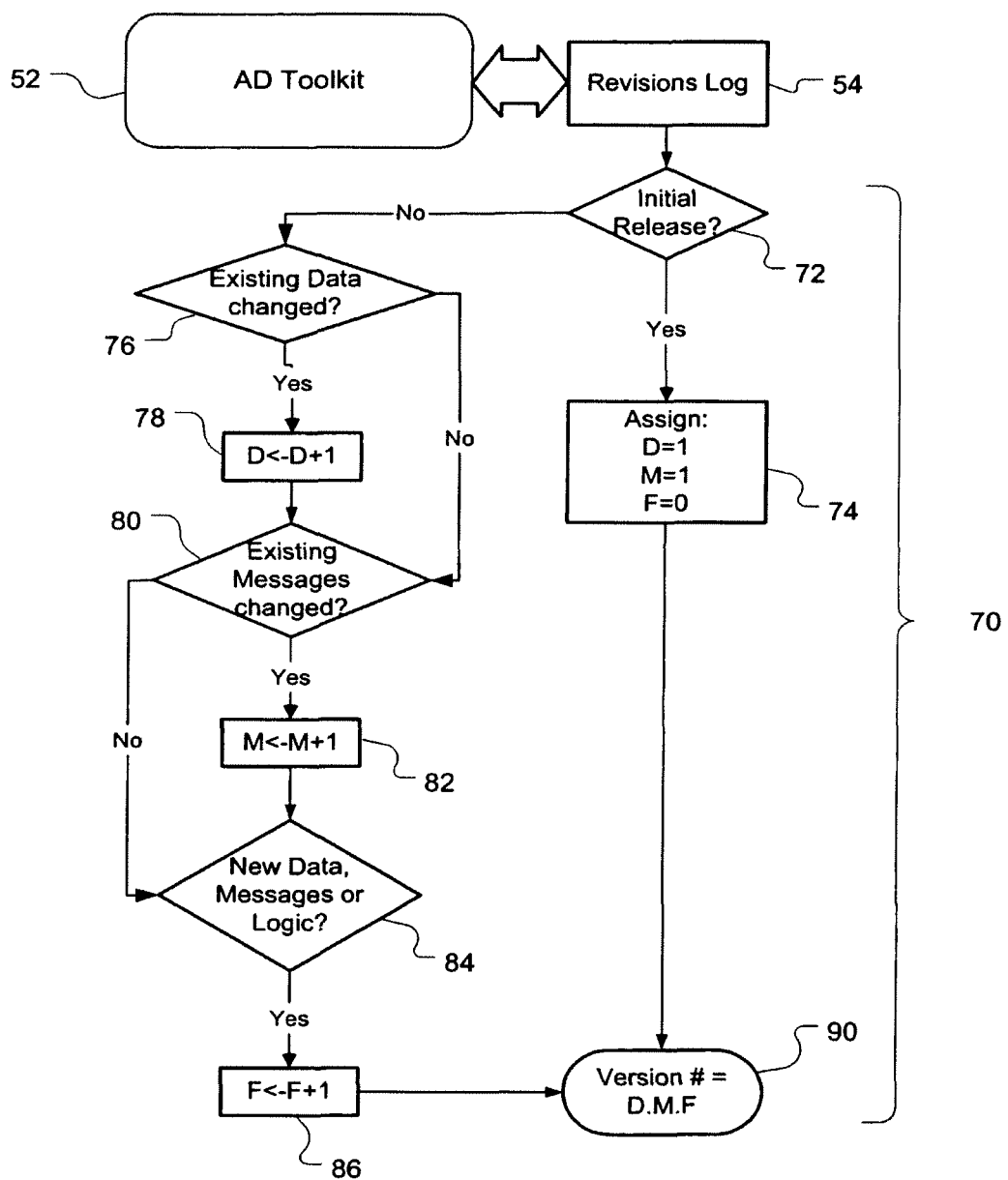
FIG. 3 is a flow chart illustrating representative operations of the versioning module of FIG. 2.

As depicted in FIG. 3, the versioning schema involves a versioning module 70 that automatically assigns a respective version number to the initial release and each update of an application. In the case of an initial release, any desired "initial" version number can be used. However, following its initial release, each subsequent update is assigned an auto-generated version number based on the type of changes made by that update. This versioning schema has a number of advantages. For example, because each version number is assigned by the versioning module, consistency between version numbers is enforced. This means, for example, that a terminal device's RE can use the version number of an update to determine whether any other updates must be installed first. Another advantage is that the RE of a terminal device can evaluate the version number of an update to detect potential compatibility issues, before attempting to install the update.

Both of these functions are enabled by formatting the version number into multiple fields, with each field representing a respective different aspect of the application. For example, the versioning module 70 is designed to detect changes in existing data components, messages or logic, as well as the addition of new data components, messages or logic which are optionally tracked by a revisions log 54. In principle, each of these elements can be represented by a respective field of the version number. However, in practice it has been found that satisfactory performance can be obtained using a three-field schema of the form "Data.Messages.Features", as described in Table 1 below.

TABLE 1

| Field | Description |
| --- | --- |
| Data | Changes in existing Data stored on the terminal device by the application and/or the RE. This may include, for example: changes in data components (e.g. to add or remove a data field, or change a field type definition); persistent global variables; or enumerations. |
| Messages | Changes in Existing Messages used by the application. This may include, for example, changes in message components (e.g. to add or remove a field, change a field type definition, or change a mapping). |
| Features | Addition of features of the application. This may, for example, include additions or changes to application logic, screens and/or globals; addition of new messages; and/or addition of data components or fields. |

With this schema, each field of the version number can be assigned an initial value (e.g. D=1, M=1, F=0) for the initial release of the application. Thereafter, for each update release, the versioning module 70 automatically generates a respective version number for the update, by incrementing the value of the applicable fields.

For example, consider an application which is released bearing the three-digit version number "1.1.0", as described above. Following initial release, the application developer produces an application update, which modifies existing data fields, and adds new application logic. These changes will be reflected in the update's version number by incrementing the Data and Features fields. Thus, the first update's version number will be 2.1.1. Following release of the first update, its version number (2.1.1) becomes the "current" version number of the application, against which the next released application update will be compared. Thus, for example, consider a second application update, which modifies the format of an existing message. This change will be reflected in the second update's version number by incrementing the Messages field, so that the second update's version number will be 2.2.1.

As will be appreciated, this pattern can be continued for any number of updates, each of which may affect any one or more aspects of the application. It will also be appreciated that the version number schema can be extended to provide finer granularity by providing four, five or indeed any larger number of fields. For example, the Features field could be replaced by a set of fields (or "sub-fields") respectively indicating the addition of new data, messages or application logic. In another example, a fourth field could be added to the version number to indicate whether or not the RE must be updated before installation of the application update. In this example, the version number would be of the form D.M.F.R where D, M, F and R are positive integer values representing Data, Message, Feature and Runtime Environment. While it is preferable to follow the convention of expressing the version number of software in the form of digits separated by periods, it should be understood that the version number need not include periods for the purpose of separating the digits. In other words, less conventional digit separator symbols could be used, such as colons, slashes, or hyphens, or no separator symbol at all. Indeed, it should be understood that the versioning scheme of the present invention could be used with any set of sequential symbols, such as letters or a combination of numbers and letters. However, it is preferable to express the version number in terms of digits separated by periods as this is widely accepted as proper notation for software versioning.

The method of implementing this versioning scheme is depicted in flow-chart form in FIG. 3. In this preferred embodiment, changes made to the wireless application using the application development toolkit 52 are tracked by the revisions log 54. The versioning module 70 begins by interrogating the revisions log 54 (at initial release query 72) to determine whether the changes to the application are in fact revisions to a previous version or whether this is an initial release of the application. If the answer to whether this is an initial release is affirmative, an initial release assignment block 74 assigns D=1, M=1, and F=0 and then passes these three fields to the version number output 90 which then composes an initial version number in the form D.M.F, i.e. 1.1.0. On a subsequent update, the version number is incremented by the versioning module 70. As shown in FIG. 3, the versioning module includes means for incrementing the fields of the version number in response to changes to different aspects of the application. The data components field D is incremented in response to a change in an aspect of the application relating to existing data components. The message components field M is incremented in response to a change in an aspect of the application relating to existing message components. The features field F is incremented in response to a change in an aspect of the application relating to features including new data components, new message components, new or altered logic, none of which introduces any incompatibilities with previous versions.

As shown in FIG. 3, the versioning module updates the version number by incrementing the respective D, M, and F fields. On a subsequent update, the answer to the initial release query 72 will be negative, and the versioning module 70 will query whether existing data components have been changed (at query 76), and if so, increments D by 1 (at incrementing means 78). The versioning module 70 then queries whether existing message components have been changed (at query 80), and if so, increments M by 1 (at incrementing means 82). The versioning module 70 then queries whether there are new data components, new message components or new or changed logic/features (at query 84), and if so, increments F by 1 (at incrementing means 86). The values of D, M and F are then passed to the version number output 90 which formulates the version number in the form "D.M.F". It should be understood that the order in which the various aspects of the application are interrogated (and hence the order in which the fields are incremented) could be different than D followed by M followed by F.

Some examples of application updates are tabulated in Table 2, below, showing the compatibility of each successive update with previous versions as well as the assignment of a three-field version number to the so-called "Wiclet", or wireless component application:

TABLE 2

| Nature of Application Update | Compatibility | Wiclet Version |
|---|---|---|
| Creation of an entirely new wireless component application | First version | 1.1.0 |
| Addition of 3 new screens | Compatible with 1.1.0 | 1.1.1 |
| Deletion of 1 data component | Not compatible with 1.1.1 | 2.1.0 |
| Addition of 1 data component and 1 message component | Not compatible with 2.1.0 | 3.2.0 |
| Correction of a typographical error on a pre-existing screen | Compatible with 3.2.0 | 3.2.1 |

It will also be appreciated that the present invention is not limited to applications per se. For example, the versioning number schema, and the updating methods described herein may equally be applied to the RE itself, thereby enabling controlled updating of the RE.

Asynchronous Software Distribution

Figure 4:
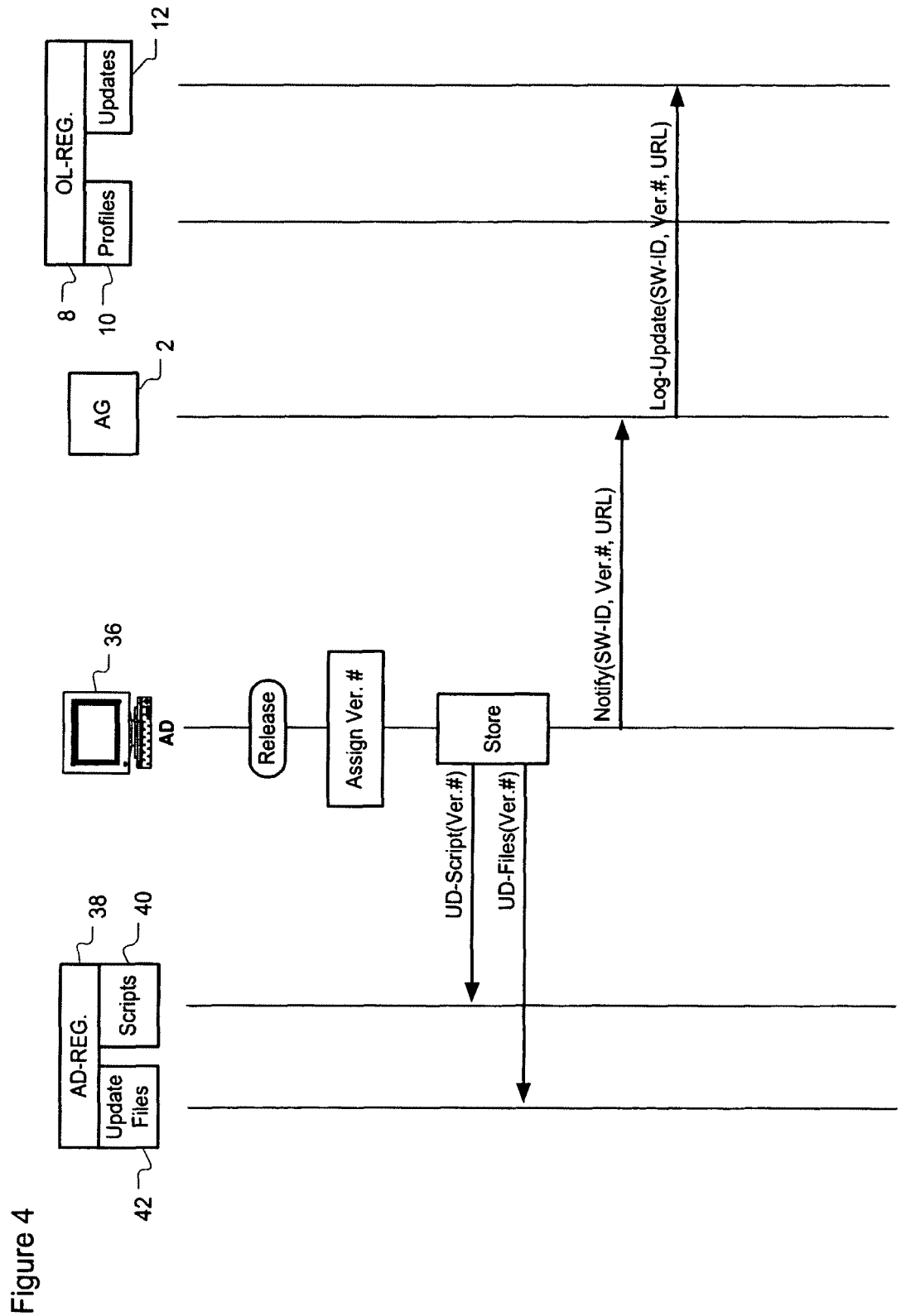
FIG. 4 is a message flow diagram schematically illustrating a process for publishing a software upgrade in accordance with an aspect of the present invention.

Referring to FIG. 4, when the application developer (AD) 36 issues a software release (of either an initial software load or an update), the versioning module assigns a version number, and stores the update script(s) and files in the application developer registry 38. The AD then sends an update notification message to the application gateway (AG) 2. The update notification message preferably includes a software identifier (SW-ID) uniquely identifying the application, the version number, and a link (e.g. a URL) to the update script stored in the scripts registry 40 (within the AD registry 38). In the preferred embodiment, the version number is communicated to the AG through the data network. In other words, the data network (e.g. the Internet) is the means for communicating the version number of the updated application to the application gateway although other means could be used. When the AG 2 receives the update notification message from the AD, the AG 2 logs the update by storing the software ID, version number and script URL in the updates registry 12 (contained within the online registry 8). Once the update has be logged by the AG 2, asynchronous distribution to users' terminal devices can be accomplished in a number of ways. Two representative distribution scenarios are described below with reference to FIGS. 5 and 6.

Figure 5:
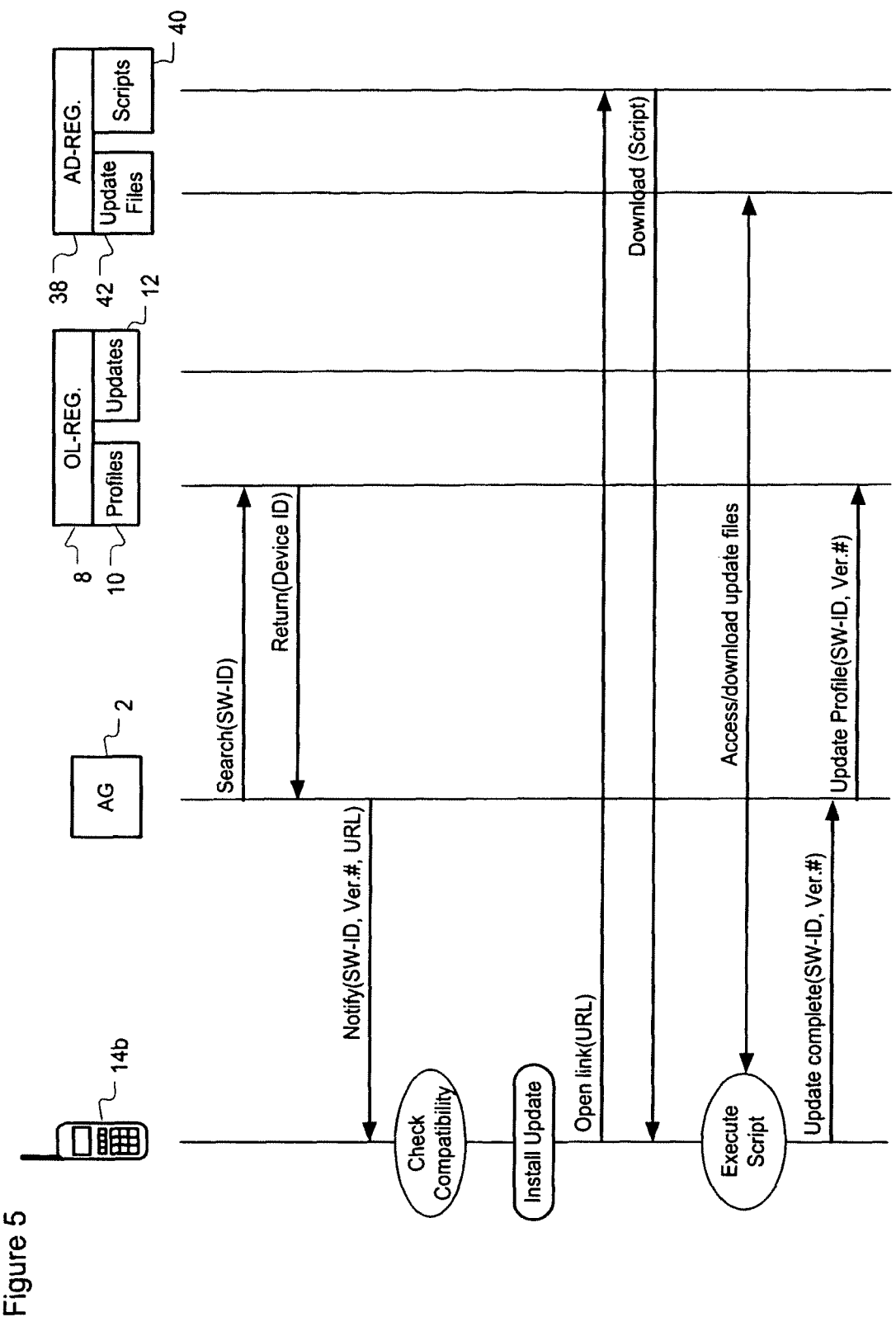
FIG. 5 is a message flow diagram schematically illustrating a process for installing a software upgrade on a terminal device in accordance with an embodiment of the present invention.

FIG. 5 illustrates an asynchronous distribution scenario which is initiated by the AG 2, for example, in response to receipt of the update notification message from the AD. In this case, the AG 2 uses the software ID (e.g. contained in the update notification) to search the profiles registry 10 (contained with the online registry 8). This search returns information (e.g. device IDs) identifying all terminal devices/wireless devices on which the application has been installed. The AG 2 can then generate and send a notification message to each of the identified terminal devices. The notification message may, for example, contain the software ID and version number of the update, as well as a link (e.g. a URL) to the update script stored in the scripts portion 40 (or scripts registry) of the application developer registry (AD-REG) 38.

Upon receipt of the notification message, the Runtime Environment (RE) can extract the software ID and version number from the message, and use this information to determine whether or not the update can be safely installed on the terminal device. This evaluation may take the form of the following compatibility checks:

Compare the "new" version number with the current version number saved in the terminal device registry (TD-REG) 28 to identify which aspects of the application are changed by the update. This function can, for example, be accomplished by field-wise subtraction of the new and current version numbers. For example, consider a case in which the current version number is "2.2.1", and the new version number contained in the notification message is "2.3.2". Field-wise subtraction of the current version number from the new version number yields "0.1.1", which indicates that the update involves: no changes to existing data components; a change to at least one existing message; and adds at least one new feature.

Determine whether any intervening updates must be installed before the "current" update identified in the notification message. This can be done using the subtraction result calculated above. In particular, if any field of the subtraction result has a value greater than "1", then there is at least one update that must be installed before the "current" update.

In general, addition of new features will not create any compatibility issues. However, changes to existing data components or messages can have compatibility problems, because it there is a possibility that user-data saved in the memory may not be compatible with the revised data and/or message definitions. In such cases, installation of the update will require conversion of the saved data, and the ability to perform such conversion may be limited by the hardware capabilities of the terminal device. In addition, data conversion carries a risk that some data may be corrupted or lost, and thus it is possible that the user may prefer to not install the update, even if the required conversion function is within the abilities of the terminal device.

Accordingly, if the RE determines that the update affects existing data components and/or existing messages, then the RE can provide a warning message to the user, indicating that an update is available but that its installation may cause a loss or corruption of data. The user can then choose whether or not the update should be installed.

When (or if) the user elects to install the update, or if the RE determines that there are no compatibility issues (i.e. the update ONLY adds new features), the RE can initiate installation of the update by opening the link (URL) contained in the update notification message, and thereby access and download the update script from the application developer registry (AD-REG) 38. Upon successful download of the update script, the RE can then launch the script, which then controls the downloading and installation of the update files from the application developer registry 38.

Upon successful installation of the update, the RE then updates the "current" version number of the application stored in the terminal device registry, using the update version number received in the update notification message, and sends an update complete message to the AG. On receipt of the update complete message, the AG updates the device profile with the new version number, to thereby indicate that the software update has been successfully installed on the terminal device.

A limitation of the scenario depicted in FIG. 5 is that the AG 2 initiates the update distribution scenario (e.g. in response to receipt of the update notification message from the AD) by sending notifications to every terminal device on which the affected software is installed. This can result in an undesirable flooding of notification messages into the network, which may tax wireless network bandwidth. In addition some terminal devices may not be connected when the AG sends the notifications, with the result that the "disconnected" terminal device could miss the update. These problems can be overcome by the asynchronous distribution scenario described below with reference to FIG. 6.

Figure 6:
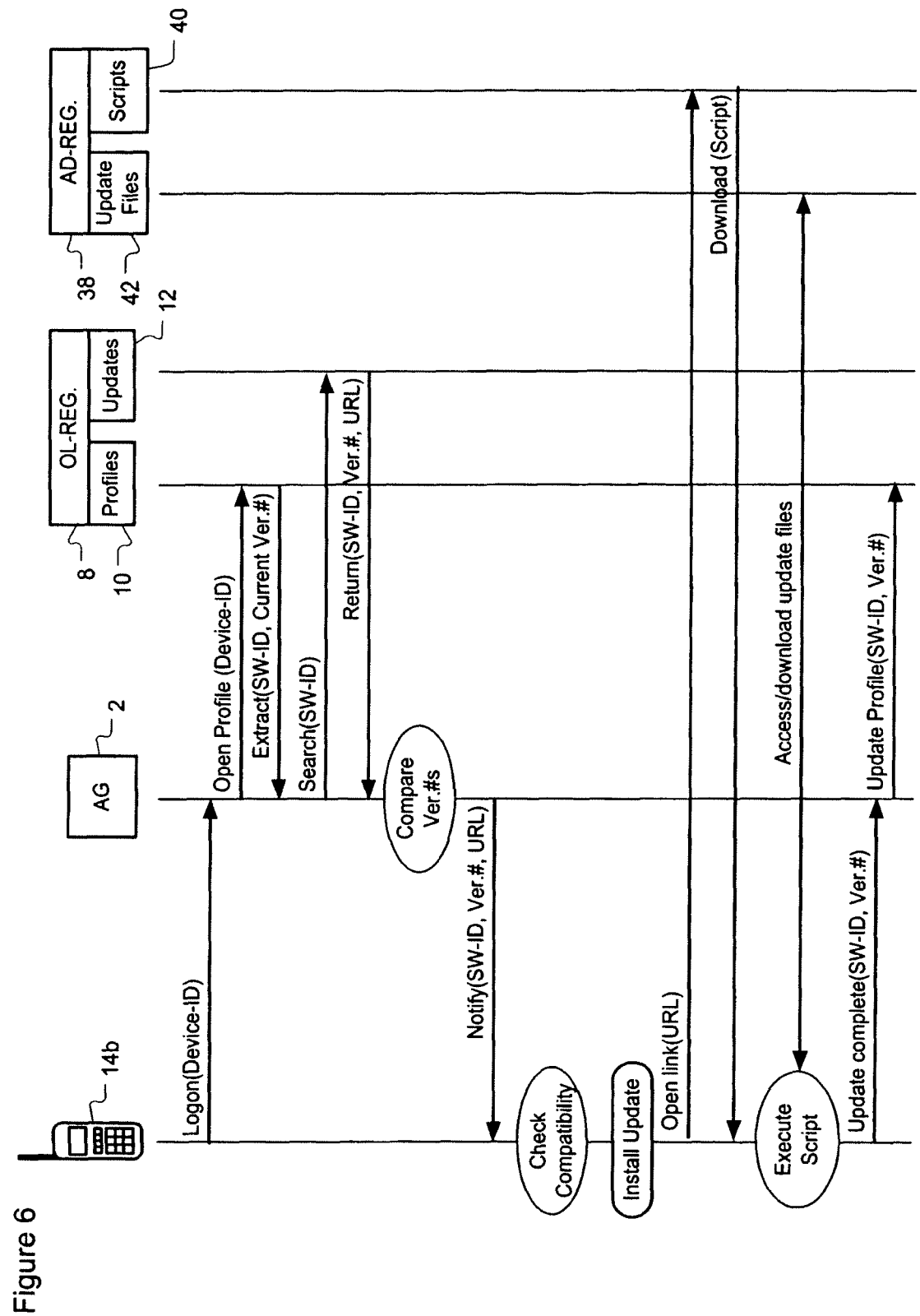
FIG. 6 is a message flow diagram schematically illustrating a process for installing a software upgrade on a terminal device in accordance with another embodiment of the present invention.

In the distribution scenario illustrated in FIG. 6, asynchronous distribution is triggered by the terminal device. In the illustrated example, the triggering event is when the terminal device logs onto the AG 2, although other events may also be used. For example, the RE could send a message to the AG 2 to check for updates in accordance with a predetermined schedule, or when an application is launched on the terminal device. In any case, the AG 2 responds to the terminal device by accessing the terminal device's profile to identify each application installed on the terminal device, and the current version number. This information is then used to search the updates registry 12 to identify any logged update affecting the terminal device, and the corresponding update version numbers. Comparison between the current and update version numbers then enables the AG 2 to determine whether there are any updates for the terminal device which have not yet been installed.

The AG 2 then formulates an appropriate update notification message for each un-installed update, which is forwarded to the terminal device. Subsequent processing by the terminal device to examine the update notification message and install updates follows the process described above with reference to FIG. 5, that is, the terminal device checks compatibility, and then installs the update by opening a link (URL) to download a script from the AD-REG 38. Executing the script on the terminal device enables access and downloading of the updates files stored in the AD-REG 38. When the update is complete, the terminal device signals the completion of the update to the AG 2 by communicating to the AG the software ID and the version number. The AG then updates the profile in the profiles registry 10 by communicating the software ID and the version number to the profiles registry 10.

To recapitulate, therefore, the versioning module (VM) of the application development environment (ADE) compares an updated version of the wireless component application with a previous version to discern what changes have been made between the two successive versions. In other words, the VM inspects or "scans" the updated application during bundling. The versioning module therefore intelligently recognizes whatever changes have been made, and upgrades the version number based on predetermined "compatibility rules" relating to data, message and feature compatibility. For example, the versioning module can determine whether data needs to be migrated or whether messages are no longer compatible.

In the preferred embodiment, the version number has three or more numbers (or digits) separated by periods. The first number represents updates to the data model that result in incompatibilities for persisted data. The second number represents updates to the message model. If the second number has been increased then the version of the wireless component application is incompatible with previous versions. The third number represents updates that involve new data components, new message components or new features that do not result in incompatibility with previous versions.

After the versioning module updates the version based on the compatibility rules, a "wiclet" (wireless component application) is then published for notifying to the application gateway (AG), as was described with reference to FIG. 4. Upon receipt of the updated wiclet, the AG inspects the message compatibility to discern whether current pending messages need to be migrated (converted) to the new message format. The AG will also cancel subscriptions for that wireless component application. The runtime environment (RE) will then update the metadata on the device with the new updated wireless component application. The RE checks the version compatibility for the persisted data and migrates/converts persisted data to the new data format. Any incoming messages that arrive during the upgrade are processed after the data migration/conversion.

The embodiments of the invention described above are intended to be exemplary only. The scope of the invention is therefore intended to be limited solely by the scope of the appended claims.

A portion of the disclosure of this patent document may contain material that is subject to copyright protection. The copyright owner has no objection to the facsimile reproduction by anyone of the patent document or patent disclosure, as it appears in the Patent and Trademark Office patent file or records, but otherwise reserves all copyright.

We claim:

1. A method of enabling controlled distribution of software updates affecting an application installed on a plurality of terminal devices of a wireless network, the method comprising steps of:
   defining a single version number for said application, said version number comprising a respective field for each one of a plurality of aspects of the application, said plurality of fields being separated from one another within said version number by a separator symbol;
   defining an initial value of each field when an initial application load is released; and
   for each successive software update affecting the application:
      identifying each aspect of the application affected by the software update; and
      incrementing a value of the respective field of each identified aspect.

2. The method as claimed in claim 1, wherein the version number comprises at least one "Data" field corresponding to data components of the application, and wherein said incrementing increments the numerical value of the "Data" field if the software update modifies any existing data components of the application.

3. The method as claimed in claim 1, wherein the version number comprises at least one "Messages" field corresponding to messages used by the application, and wherein said incrementing increments the numerical value of the "Messages" field if the software update modifies any existing messages used by the application.

4. The method as claimed in claim 1, wherein the version number comprises at least one "Features" field corresponding to functional features of the application, and wherein said incrementing increments the numerical value of the "Features" field if the software update adds any one or more of new data components, new messages, and new application logic to the application.

5. The method of claim 1 wherein said incrementing comprises incrementing a value of a given one of said respective fields of said single version number independently of any incrementing of a value of any other one of said respective fields of said single version number.

6. The method of claim 1 wherein the value of at least one of said fields is a letter.

7. The method of claim 1 wherein said separator symbol is a colon, slash or hyphen.

8. The method of claim 1 wherein said incrementing comprises, for a single one of said successive software updates, incrementing each field of said plurality of fields of said version number.

9. A system for enabling controlled distribution of software updates affecting an application installed on a plurality of terminal devices of a wireless network, the system comprising:
   a computing device connected to a data network for communicating with an application gateway mediating the data network and the wireless network;
   an application development environment (ADE) running on the computing device for enabling the application to be updated, the ADE including a versioning module for generating a single version number for said application, said version number defined by a plurality of fields representing different aspects of the application, said plurality of fields being separated from one another within said version number by a separator symbol, the versioning module causing said computing device to:
      compare an updated version of the application with a previous version of the application to determine what changes have been made to the different aspects of the application;
      increment the fields of the version number in response to the changes to the different aspects of the application; and
      communicate the version number of the updated application to the application gateway.

10. The system as claimed in claim 9 wherein the version number is defined to include fields representing changes to Data, Messages and Features.

11. The system as claimed in claim 9 wherein the version number is defined in the form D.M.F where D represents changes to aspects of the application relating to data, M represents changes to aspects of the application relating to messages, and F represents changes to aspects of the application relating to features.

12. The system of claim 10 wherein said incrementing increments:
   a given value of D independently of the respective values of M and F;
   a given value of M independently of the respective values of D and F; and
   a given value of F independently of the respective values of D and M.

13. The system as claimed in claim 9 wherein the versioning module defines an initial version number for an initial version of the application and then increments the first digit by 1 when a change is detected in an aspect of the application relating to data, increments the second digit by 1 when a change is detected in an aspect of the application relating to messages, and increments the third digit by 1 when a change is detected in an aspect of the application relating to application features.

14. The system as claimed in claim 9 wherein the versioning module defines an initial version number for an initial version of the application and then increments the first digit by 1 when a change is detected in an aspect of the application relating to existing data components, increments the second digit by 1 when a change is detected in an aspect of the application relating to existing messages, and increments the third digit by 1 when a change is detected in an aspect of the application relating to existing or new application logic, new data components, or new message components.

15. The system as claimed in claim 9 wherein the comparing of the updated version of the application with the previous version of the application is performed using a revisions log for tracking changes made to the application within the application development environment.

16. A method of implementing a versioning scheme for updates to a software application to be distributed to a plurality of wireless devices in a wireless network through an application gateway mediating the wireless network and a data network, the method comprising the steps of:
- defining an initial single version number corresponding to an initial version of the application, the version number having at least three fields defining a data components field, a message components field and a features field;
- incrementing the data components field in response to an update in an aspect of the application relating to data components;
- incrementing the message components field in response to an update in an aspect of the application relating to message components; and
- incrementing the features field in response to an update to an aspect of the application relating to features, whereby an updated version number is generated that is indicative of the compatibility of the update with previous versions of the application.

17. The method as claimed in claim 16 further comprising the step of notifying the updated version number to the application gateway.

18. The method as claimed in claim 17 further comprising the step of notifying the updated version number to the terminal device to enable the terminal device to check compatibility with the updated application and, where an incompatibility is detected, to install the update by downloading and executing a script that accesses and downloads update files.

19. The method as claimed in claim 16 wherein the initial version number is initialized to an initial version number and wherein the data components, message components and feature fields are respectively incremented by 1 in response to changes in aspects of the application relating, respectively, to existing data components, to existing message components and to features, whereby aspects relating to features include additions of new data components, additions of new message components, additions of new logic and changes to existing logic that are compatible with the previous versions.

20. The method as claimed in claim 16 wherein the version number further comprises a fourth field occupied by a fourth digit that is incremented in response to changes to a fourth aspect of the application.

21. The method as claimed in claim 16 wherein the step of incrementing the features field in response to an update in an aspect of the application relating to features comprises incrementing the features field in response to additions of new logic, new data components, new message components or changes to existing logic which are compatible with the previous version of the application.

* * * * *